Patented July 27, 1943

2,325,029

UNITED STATES PATENT OFFICE 2,325,029

CALCIUM GLUCONATE SOLUTION

William B. Baker, Peoria, Ill., assignor to Sutliff & Case Co., Inc., Peoria, Ill., a corporation of Illinois No Drawing. Application April 21, 1941, Serial No. 389,687

3 Claims. (Cl. 167—68)

This invention relates to stable and supersaturated solutions of calcium gluconate especially useful as therapeutic compounds for parenteral injection.

Ordinarily, calcium gluconate is soluble in water at room temperature to a strength of approximately 3%. A percentage solution of this character is not particularly effective as a medicinal preparation, since much greater concentrations are necessary for medicinal use, especially when the administration is by intravenous, intramuscular and subcutaneous methods. A much higher concentration is necessary, to the point of supersaturation, where a solution of calcium gluconate is therapeutically indicated.

In a highly concentrated solution of this character no toxic or harmfully irritant substances can be present, otherwise the well being of the subject will be endangered and undesirable by-effects produced. Similarly, supersaturated solutions of calcium gluconate prepared for hypodermic injection must remain stable, clear and free from precipitation or sedimentation.

Substances which have been previously used for the purpose of preparing supersaturated solutions have often proved to result in highly irritant and often toxic injections.

My invention consists in the addition of strontium chloride or strontium lactate to solutions of calcium gluconate. I have found that by combining these strontium salts with calcium gluconate that this permits an unusually high degree of concentration of calcium gluconate in solution, and at the same time renders the solution stable and free of precipitation or sedimentation. In addition to these two strontium salts being excellent stabilizing agents for solutions of calcium gluconate, strontium is also useful in such solutions because it is comparatively inert in small doses even when injected into the blood stream; and because in moderate doses strontium closely resembles the characteristic pharmacological actions of calcium ion, even though it is much weaker than the calcium ion.

When strontium chloride or strontium lactate is used as the stabilizing agent, the stability can be increased to even a greater degree if a small amount of an acid is added. Diluted hydrochloric acid U. S. P. may be useful in this respect, since only a small amount of this acid is necessary to act in such a supplemental capacity. When diluted hydrochloric acid is present, solutions of calcium gluconate that have been rendered stable by strontium chloride or strontium lactate may be reduced in either of these two salts without lessening the stability of the solutions. This is attractive especially from an economy standpoint. It should be noted, however, that such supersaturated solutions of calcium gluconate cannot be prepared using only the small amounts of diluted hydrochloric acid, without the strontium chloride or strontium lactate present. It is the strontium chloride, or the strontium lactate, which is the stabilizing agent in these solutions. Furthermore, it is to be emphasized that only small amounts of diluted hydrochloric acid should be used, if this acid is used at all in such supersaturated solutions of calcium gluconate; otherwise the final solution may be rendered irritating when administered hypodermically in the subject especially if injections are made by the subcutaneous or intramuscular route.

When diluted hydrochloric acid is used for the purpose of increasing the stability to even a greater degree, as little as 35 cc. of this acid may be present in a gallon of the finished supersaturated solution of calcium gluconate (which is stabilized by strontium chloride or strontium lactate); or as much as 1000 cc. of this acid may be present in a gallon of the finished solution. It should be pointed out that the addition of the higher limits of diluted hydrochloric acid may render the finished solution irritant if used by the subcutaneous or intramuscular routes of administration. Therefore, if the higher amounts of the diluted acid are used, the use of the finished solution should be limited to intravenous use only.

For purposes of illustration the following examples (each one of which will prepare one gallon of finished solution) are given:

*Example 1.*—To 3500 cc. of sterile, boiling distilled water add 908 grams of calcium gluconate, and after the calcium gluconate is entirely dissolved add 378.5 grams of strontium chloride. Boil until the strontium chloride goes entirely into solution, or until all centers of crystallization are destroyed. Then add 35 cc. of diluted hydrochloric acid, $\frac{1}{10}$% of cresol (added merely to prevent mould growth), and sufficient distilled water to bring the volume of the finished solution up to one gallon. This particular example contains calcium gluconate to the extent of 24%, weight to volume.

*Example 2.*—To 3500 cc. of sterile, boiling distilled water add 908 grams of calcium gluconate, and after the calcium gluconate is entirely dissolved add 454 grams of strontium lactate. Boil until the strontium lactate goes entirely into solution, or until all centers of crystallization are destroyed. Then add 50 cc. of diluted hydrochloric acid, $\frac{1}{10}$% of cresol (added merely to prevent mould growth), and sufficient distilled water to bring the volume of the finished solution up to one gallon. This particular example contains calcium gluconate to the extent of 24%, weight to volume.

The above examples are illustrative only since the process procedure may be varied. The strontium chloride or strontium lactate may be combined with dry calcium gluconate and dissolved in distilled water by boiling, or either of the strontium salts added to boiling solutions of calcium gluconate to secure solutions of calcium gluconate concentrated well above the normal 3%, as to 30% or higher.

All processes of preparation should include precautions to ensure that the resulting solutions be sterile, this being simply good practice in manufacture.

A solution containing approximately 24% of calcium gluconate appears to be optimum for therapeutic purposes because it permits administration of a practical and proper amount of the medicament and for the further reason that a solution much more concentrated would be of impractical viscosity and a too viscous solution would not be well adapted for parenteral injection.

The invention includes therefore, solutions of calcium gluconate above 3% concentration and containing strontium chloride or strontium lactate, either with or without the presence of acid.

What I claim is:

1. A stable aqueous solution of calcium gluconate in concentration greater than 3% containing strontium lactate.

2. A stable aqueous solution of calcium gluconate in concentration greater than 3% containing strontium lactate and hydrochloric acid.

3. A stable aqueous solution of calcium gluconate in concentration greater than 3% containing a strontium salt of the group consisting of strontium chloride and strontium lactate.

WILLIAM B. BAKER.